United States Patent
Penev et al.

(10) Patent No.: US 7,672,912 B2
(45) Date of Patent: Mar. 2, 2010

(54) CLASSIFYING KNOWLEDGE AGING IN EMAILS USING NAÏVE BAYES CLASSIFIER

(75) Inventors: Kamen Penev, Sammamish, WA (US); Stuart H. Marshall, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 341 days.

(21) Appl. No.: 11/586,923

(22) Filed: Oct. 26, 2006

(65) Prior Publication Data
US 2008/0154813 A1    Jun. 26, 2008

(51) Int. Cl.
G06F 15/18    (2006.01)
(52) U.S. Cl. ........................................................ 706/14
(58) Field of Classification Search ........................ None
See application file for complete search history.

(56) References Cited

U.S. PATENT DOCUMENTS

| | | | |
|---|---|---|---|
| 6,182,058 | B1 | 1/2001 | Kohavi |
| 6,456,991 | B1 * | 9/2002 | Srinivasa et al. ............... 706/20 |
| 6,694,303 | B1 | 2/2004 | Agrawal et al. |
| 6,901,398 | B1 * | 5/2005 | Horvitz et al. ............... 709/206 |
| 6,973,459 | B1 * | 12/2005 | Yarmus ....................... 707/102 |
| 7,124,121 | B1 * | 10/2006 | Drescher ..................... 706/12 |
| 2001/0044791 | A1 | 11/2001 | Richter et al. |
| 2002/0042793 | A1 | 4/2002 | Choi |
| 2003/0065926 | A1 | 4/2003 | Schultz et al. |
| 2004/0172374 | A1 * | 9/2004 | Forman ....................... 706/12 |
| 2004/0243548 | A1 | 12/2004 | Hulten et al. |
| 2005/0154686 | A1 | 7/2005 | Corston et al. |
| 2005/0192824 | A1 | 9/2005 | Schuetze et al. |
| 2005/0246410 | A1 | 11/2005 | Chen et al. |
| 2006/0059112 | A1 | 3/2006 | Cheng et al. |
| 2006/0075494 | A1 | 4/2006 | Bertman et al. |
| 2006/0095521 | A1 * | 5/2006 | Patinkin ...................... 709/206 |
| 2007/0112701 | A1 * | 5/2007 | Chellapilla et al. ............ 706/15 |

OTHER PUBLICATIONS

Freund, Yoav and Schapire, Robert E., "A short Introduction to Boosting", 14 pps, 1999.*
Freund, Yoav and Schapire, Robert E., A Decision-Theoretic Generalization of On-Line Learning and an Application to Boosting, pp. 119-139, 1997.*
Androutsopoulos, et al., "An Evaluation of Naive Bayesian Anti-Spam Filtering", Date: 2000, pp. 9-17, http://scholar.google.com/scholar?hl=en&lr=&q=cache:xiDAf7O41YEJ:arxiv.org/abs/cs.CL/0006013/++Naive+bayesian+classifier.
Elkan, Charles, "Boosting and Naive Bayesian Learning", Date: Sep. 1997, http://scholar.google.com/scholar?hl=en&lr=&q=cache:thgnxaNlhpsJ:ed-02.ams.eng.osaka-u.ac.jp/~kfm/courses/nn/References/Elkan1997.pdf++Naive+bayesian+classifier.
Langley, et al., "Induction of Selective Bayesian Classiers", Date: 1994, http://scholar.google.com/scholar?hl=en&lr=&q=cache:9KDdH4E2_PwJ:www.cs.uu.nl/docs/vakken/pn/select.uai94.ps+Langley_+P_+and+Sage_+S_+%22Induction+of+Selective+Bayesian.

* cited by examiner

*Primary Examiner*—David R Vincent
*Assistant Examiner*—Ola Olude-Afolabi (57) ABSTRACT

The Naïve Bayes Classifier predicts the classification of a set of data based on the features of that data and a series of counts reflecting the information obtained from prior data sets, with one count per feature per class. An external boost can be applied to the counts generated by the NBC to account for external information. Such a boost is added to the counts generated by the NBC, and the boosted counts are then used by the NBC. A boost can be applied to some or all of the counts and the boost for each count can be applied independently. Likewise, the counts can be periodically aged by multiplying the counts with an aging factor of between 0 and 1 per period. Aging factors can be applied uniformly across all counts, or can be individually applied, enabling some counts to age more than others.

11 Claims, 7 Drawing Sheets

CLASSIFYING KNOWLEDGE AGING IN EMAILS USING NAÏVE BAYES CLASSIFIER

BACKGROUND

In addition to being able to follow a set of pre-defined instructions, such as in a computer program, computers can also operate by collecting data and extrapolating from the data an appropriate action. Such behavior is commonly referred to as "machine learning" because the computing "machine," rather than being simply instructed as to the appropriate action given a particular set of inputs, "learns" the appropriate action by collecting relevant data and extrapolating the appropriate action from the data. One common approach to machine learning is to use statistical algorithms that calculate various statistical properties of an observed set of data and then use the resulting statistical model to determine appropriate future actions.

Frequently, statistical machine learning is used to form predictions based on statistical similarities to previously observed data. For example, an electronic mail (email) program can classify emails as being "junk" based on the statistical similarities of the currently received emails to previously received emails that the user has already indicated were, or were not, junk. Similarly, electronic commerce software can classify transactions as being "legitimate" or "fraudulent" based on the statistical similarities of the current transaction to prior transactions that have been verified to be either legitimate or fraudulent.

One example of a statistical learning system is the Naïve Bayes Classifier (NBC). An NBC essentially counts features of the data on which the statistical model will be based. Thus, an NBC will represent its statistical model as a list of "counts," with one count per "feature" per "class." A "count," as used in connection with NBCs, is a value indicating the number of times that a particular feature was associated with a particular class in the observed data set. A "feature," as used in connection with NBCs, is an element of the data. Common features of email data, such as would be counted for purposes of identifying junk email, can include the sender, the sending host, the words of the title and the words of the email text itself. Finally, a "class," as used in connection with NBCs, is one of the classifications which the NBC will assign to new data. Thus, in an email program, multiple classes could exist, including "junk," "priority," "work," "personal" and the like. In electronic commerce, a binary classification could exist, such as classifying each transaction as either "legitimate" or "fraudulent."

SUMMARY

Statistical learning systems, including the Naïve Bayes Classifier, require some initial data set upon which to "train." A more comprehensive initial data set will generally result in greater predictive accuracy. To compensate for smaller initial data sets, or even no data set at all, an external boost can be applied to the counts generated by the NBC. The external boost can be derived from more informal sources and need not be mathematically precise. Instead, it can act to "jumpstart" an NBC system that has a smaller initial data set or no data set at all. A boost can be applied to some or all of the counts generated by the NBC and the boost for each count can be applied independently.

Statistical learning systems, including the Naïve Bayes Classifier, can also sometimes be slow to respond to fast moving trends. For example, if there have been 11 prior transactions using a particular credit card number that has been verified to be legitimate, an NBC will continue to predict that a transaction using that credit card number will be legitimate even if the most recent 10 transactions have been verified to be fraudulent. More colloquially, the NBC will not recognize that the credit card number has been likely compromised since, based on the 21 transactions analyzed by the NBC, there is still an 11-in-21 chance (or 52.4% chance) that the current transaction using that credit card number is legitimate. Furthermore, this "inertia" of the classical NBC increases with time, as its counts accumulate. To enable a faster response to trends, an aging process can be applied to the counts used by an NBC. Thus, using the above example, the 11 legitimate transactions would not supercede, by sheer numbers, the 10 fraudulent transactions, since the 11 legitimate transactions occurred in the more distant past and, consequently, would have been discounted. Aging factors can be applied uniformly across all counts, or can be individually applied, enabling some counts to age more than others. Aging factors can be applied either on a cyclical, periodic basis, such that the counts are iteratively aged or they can be applied at any desired point in time. Aging factors can be applied to both counts and to the original data elements that are summed to create the counts. In the latter case, the aging factors can be appropriately varied such that older data is aged more than newer data, or that newer data is aged more than older data. While aging factors would most commonly be selected between zero and one, inclusive, aging factors greater than one can also be used so that counts increase in value as they age.

The boosting and the aging can be applied independently. Thus, some counts can be both boosted and periodically aged, while some may have only one, or even none of these adjustments applied. The boost and aging can be applied by a human through one or more human-computer interfaces, such as an entry screen or as part of a larger program, such as an email program or an electronic commerce program. Alternatively, the boost and aging can be selected by an algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to modifying the counts produced by a Naïve Bayes Classifier (NBC) through a boosting mechanism, an aging mechanism, or a combination of both mechanisms. A boosting mechanism can increase any count by a specified value. An aging mechanism can increase or, more commonly, decrease some or all of the counts by a specified factor. Alternatively, an aging mechanism can be applied to the original data elements upon which the counts are based. Each count can be boosted or aged independently.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing device need not be limited to conventional personal computers, and includes other computing configurations, including hand-held devices, multi-processor systems, microprocessor based or programmable consumer electronics, network PCs, minicomputers, mainframe computers, and the like. Similarly, the computing device need not be limited to a single computing device as the mechanisms may also be practiced in distributed computing environments where tasks are performed by remote processing devices that are linked through a communications network. In a distributed computing environment, program modules may be located in both local and remote memory storage devices.

Figure 1:
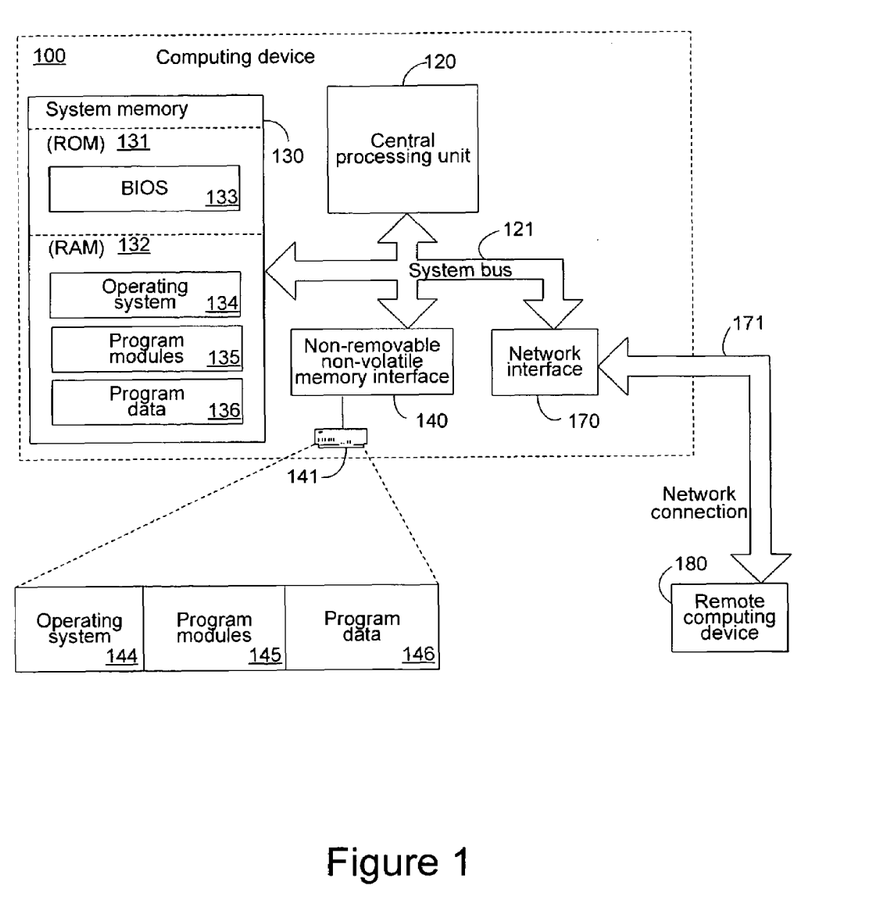
FIG. 1 is a block diagram of an exemplary computing device.

With reference to FIG. 1, an exemplary computing device 100 is illustrated. The computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 may operate in a networked environment using logical connections to one or more remote computers, such as a remote computing device 180. The remote computing device 180 may be a personal computer, a server, a router, a network PC, a peer device or other common network node, and typically includes many or all of the elements described above relative to the computing device 100. The logical connection depicted in FIG. 1 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of the remote computing device 180. It will be appreciated that the network connections shown are exemplary and other means of establishing a communications link between the computers may be used.

Figure 2A:
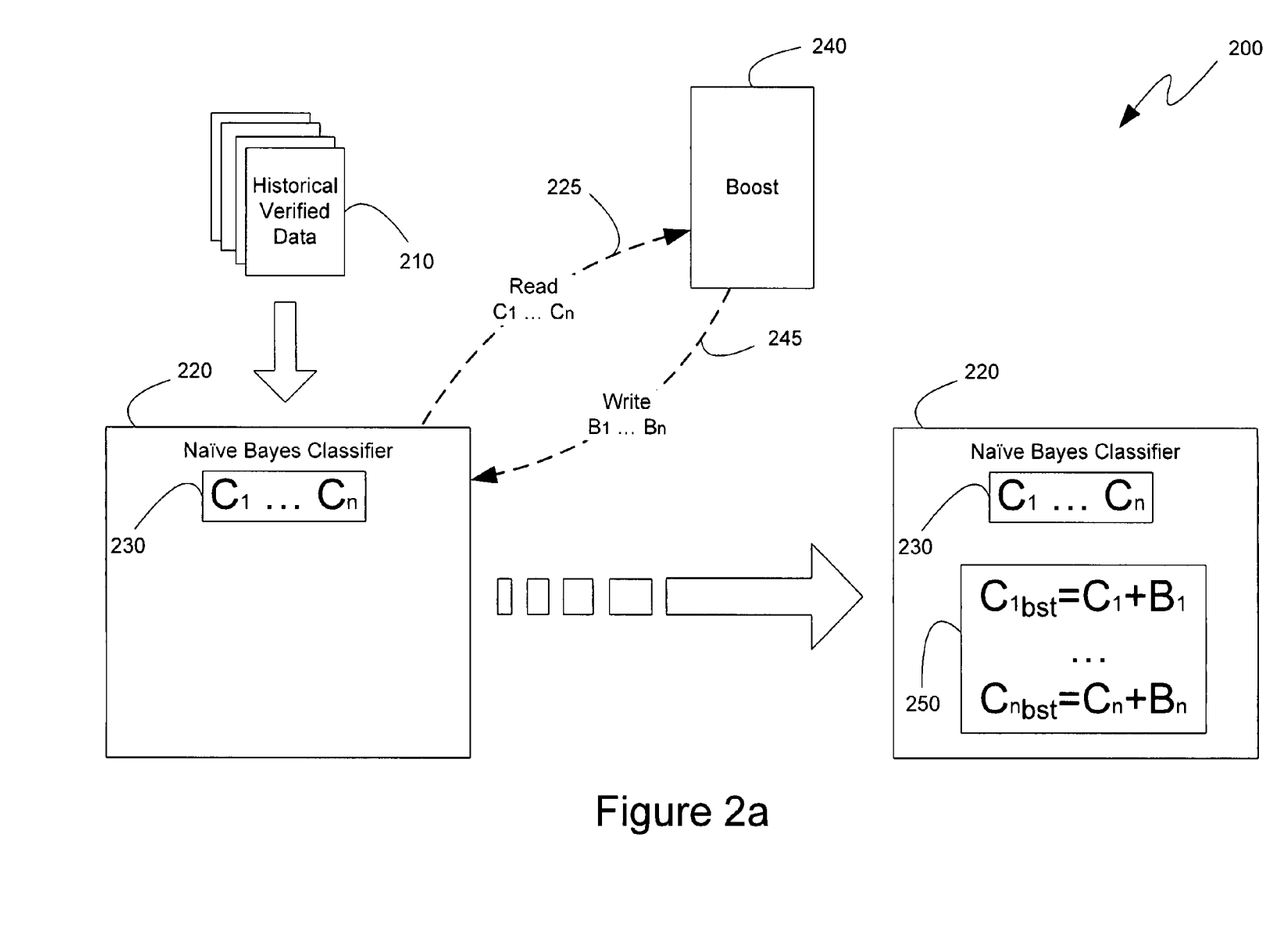
FIG. 2a is a block flow diagram illustrating an exemplary boosting process.

Turning to FIG. 2a, block flow diagram 200 illustrates one exemplary embodiment for applying a boost to the counts of an NBC. As shown, a Naïve Bayes Classifier 220 can receive input from historical verified data 210. The historical verified data 210 can be any collection of data for which the classification of each data entry has been verified. In addition, each data entry can comprise one or more features which the NBC will count. As an example, in the context of electronic commerce, each verified data entry can be an individual transaction that has been classified as fraudulent or legitimate. In addition, each data entry can comprise one or more features such as the type of credit card used, the credit card number, the billing address of the credit card, the shipping address selected for the particular transaction and other like features.

The NBC 220 can receive the historical verified data 210 as an input and can build a statistical model comprising a series of counts 230 in a known manner, with one count per feature per class. To illustrate the operation of the NBC 220 in building the statistical model comprising the counts 230, the historical verified data 210 will, for the present example only, be assumed to comprise five transactions, with three of the transactions having shipping addresses in the United States and two having shipping addresses in Nigeria. Of the three having US shipping addresses, two can have been classified as legitimate, while the third can have been classified as fraudulent. Of the two transactions having shipping addresses in Nigeria, one can have been classified as legitimate, while the other can have been classified as fraudulent. In such an example, the counts of the statistical model built by the NBC 220 can be as follows: $C_{shipping\_address=US\&class=legitimate}=2$, $C_{shipping\_address=US\&class=fraudulent}=1$, $C_{shipping\_address=Nigera\&class=legitimate}=1$ and $C_{shipping\_address=Nigera\&class=fraudulent}=1$.

Based on the above exemplary historical verified data 210, and the resulting counts 230, the NBC 220 will determine that the chances of a fraudulent transaction based on a shipping address located in the United States are 33%, while the chances of a fraudulent transaction based on a shipping address located in Nigeria are 50%. These values, however, reflect only the information present in the historical verified data 210 and do not encompass other data sources. For example, it may be "common knowledge" among electronic commerce specialists that shipments to Nigeria experience a very high fraud rate. Alternatively, prior practical experience, which may not necessarily be available as data that can be consumed by the NBC 220, can also suggest to an electronic commerce specialist that the fraud rate for shipments to the United States is much lower than 33%.

The historical verified data 210 can also be incomplete with respect to other data sources. For example, the historical verified data 210 may comprise no data regarding transactions shipped to Canada. In cases of inaccurate or incomplete data, the counts 230 of the statistical model built by the NBC 220 can be boosted to more accurately reflect "external" information, or information that was not consumed by the NBC 220 to generate the counts 230. A boosting mechanism 240 can apply a boost to each count of the counts 230 on an independent basis. Alternatively, the boosting mechanism 240 can apply an equivalent boost to all of the counts 230. The boosting mechanism 240 is not limited to boosting only those counts that already have a non-zero value. As an example, the boosting mechanism 240 can boost counts corresponding to shipments to Canada, even though such counts would have a value of zero since the exemplary historical verified data 210 above comprised no information regarding shipments to Canada.

In one embodiment, the boosting mechanism 240 can comprise computer-readable instructions for adding a boost to one or more counts. In an alternative embodiment, the boosting mechanism 240 can further comprise an interface for providing a manner in which external processes can obtain the current count values and specify a particular boost value for one or more of the counts. Such an interface can be a standard Application Program Interface (API) providing read and write access, or can be any other published or unpublished interface and can be either limited to intra-process communication or can include inter-process communications. FIG. 2a illustrates a read interface 225 and a write interface 245. Read interface 225 can provide the boosting mechanism 240 with the current counts 230 and, optionally, any boost factors that were previously applied to the counts, though FIG. 2a illustrates only the former since the read interface 225 is shown, strictly as an example, as originating with the NBC 220 at a time prior to the application of any boost factors. Write interface 245, on the other hand can be used by the boosting mechanism to provide the boost factors to the NBC 220. In a further alternative embodiment, the boosting mechanism 240 can further comprise a mechanism for enabling a human user to specify a boost value for one or more counts. For example, the boosting mechanism 240 can include a front-end interface comprising common value entry elements, such as text boxes or slider bars. In addition, the front-end interface can also provide guidance to a user, such as guidance as to how particularly sized boost values can affect the counts 230, given the size of the counts themselves.

Upon receiving the boost values from the boosting mechanism 240, such as through the write interface 245, the NBC 220 can boost the counts 230 as appropriate. In one embodiment, the NBC 220 can boost the counts 230 by summing the count to be boosted with the corresponding boost factor. In an alternative embodiment, the NBC 220 can boost the counts 230 by multiplying the count to be boosted by the corresponding boost factor. In some instances, the boosting factor may not change the original count, such as, for example, if the boosting factor is zero and is being added to the count, or if the boosting factor is one and the count is being multiplied by the boosting factor.

FIG. 2a illustrates an embodiment in which the resulting boosted counts 250 are the sum of the counts 230 and a boosting factor nominated "B" in the figure. Strictly as an example, using the above exemplary counts: $C_{shipping\_address=US\&class=legitimate}=2$, $C_{shipping\_address=US\&class=fraudulent}=1$, $C_{shipping\_address=Nigera\&class=legitimate}=1$ and $C_{shipping\_address=Nigera\&class=fraudulent}=1$, a boost can be applied to accommodate for the external information referenced. Thus, to account for a high fraud rate when the shipping address is in Nigeria, a boost value $B_{shipping\_address=Nigera\&class=fraudulent}=10000$ can be selected. Likewise, to account for a relatively low fraud rate when the shipping address is in the United States, a boost value $B_{shipping\_address=US\&class=legitimate}=10000$ can be selected. In addition, boost values of $B_{shipping\_address=Canada\&class=legitimate}=10000$ and $B_{shipping\_address=US\&class=fraudulent}=1$ can be used to "teach" the NBC 220 that there is a low fraud rate when the shipping address is in Canada, even though the exemplary historical verified data 210, above, comprised no information regarding transactions being shipped to Canada. The resulting boosted counts 250, using the current example, will be:

$C_{shipping\_address=US\&class=legitimate}=10002$,
$C_{shipping\_address=US\&class=fraudulent}=1$,
$C_{shipping\_address=Nigeria\&class=legitimate}=1$,
$C_{shipping\_address=Nigeria\&class=fraudulent}=10001$,
$B_{shipping\_address=Canada\&class=legitimate}=10000$ and $B_{shipping\_address=US\&class=fraudulent}=1$. Using these exemplary boosted counts, the NBC 220 will conclude that shipments to the US have a less than 0.01% chance of being fraudulent, while shipments to Nigeria have a greater than 99.99% chance of being fraudulent. The NBC 220 will likewise conclude that shipments to Canada have a less than 0.01% chance of being fraudulent. As can be seen from the exemplary values used, such boosts can significantly impact future predictions made by the NBC 220. As can also be seen from the above example, boosts can be used to create a more accurate predictive environment in those situations where the historical verified data 210 with which the NBC 220 was trained was insufficient, or even non-existent.

The boosted counts 250 can then be used by the NBC 220 as new verified data is provided to it. Thus, as an example, if new verified data comprised a transaction whose shipping address was in the US, and which was verified to be fraudulent, the boosted counts 250 could be modified by the NBC 220 to produce a statistical model comprising a subsequent iteration of counts 230 as follows:
$C_{shipping\_address=US\&class=legitimate}=10002$,
$C_{shipping\_address=US\&class=fraudulent}=2$,
$C_{shipping\_address=Nigeria\&class=legitimate}=1$,
$C_{shipping\_address=Nigeria\&class=fraudulent}=10001$,
$B_{shipping\_address=Canada\&class=legitimate}=10000$ and $B_{shipping\_address=US\&class=fraudulent}=1$.

Figure 2B:
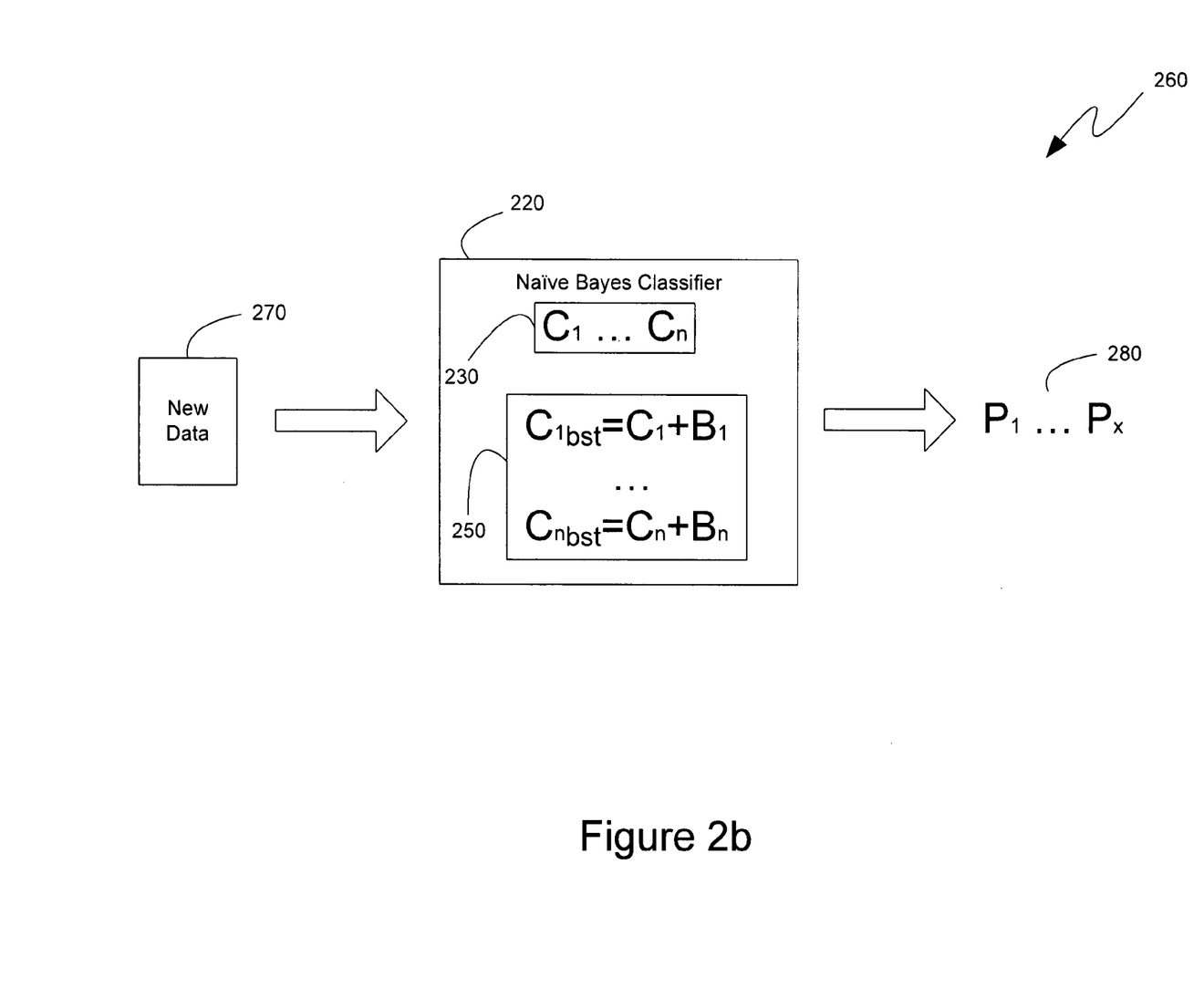
FIG. 2b is a block flow diagram illustrating an exemplary use of a boosting process for generating predictions.

Turning to FIG. 2b, block flow diagram 260 illustrates an exemplary usage of the NBC 220 as a predictive device. The boosted counts 250 maintained by the NBC 220 can be used to predict the classification of new data 270 based on the features of the new data 270. Thus, again returning to the above example, if the new data 270 comprised a transaction that includes a shipping address in the United States, the NBC 220 could indicate that the probability that the transaction was legitimate was greater than 99.99%, while the probability that it was fraudulent was less than 0.01%. In the above example, there are only two classifications: legitimate and fraudulent. However, because NBCs can be used to assign probabilities to more than two classifications, a series of probabilities 280, with one probability per classification, can be provided by the NBC 220.

In some applications of statistical learning, including applications using an NBC, prior data remains an accurate gauge for future data. For example, emails soliciting home mortgage refinancing are as likely to be deemed "junk" by a user today as they are by a user two years from now. In other applications, however, more recent data can be a more accurate gauge than older data. For example, in an electronic commerce environment, data indicating that the two most recent purchases sent to a particular address were found to be fraudulent is likely to be more relevant to the determination of whether a current order being requested for that address is also fraudulent than older data indicating that the first three purchases sent to that address were legitimate. To accommodate for such applications, an aging of the counts can be performed.

Figure 3A:
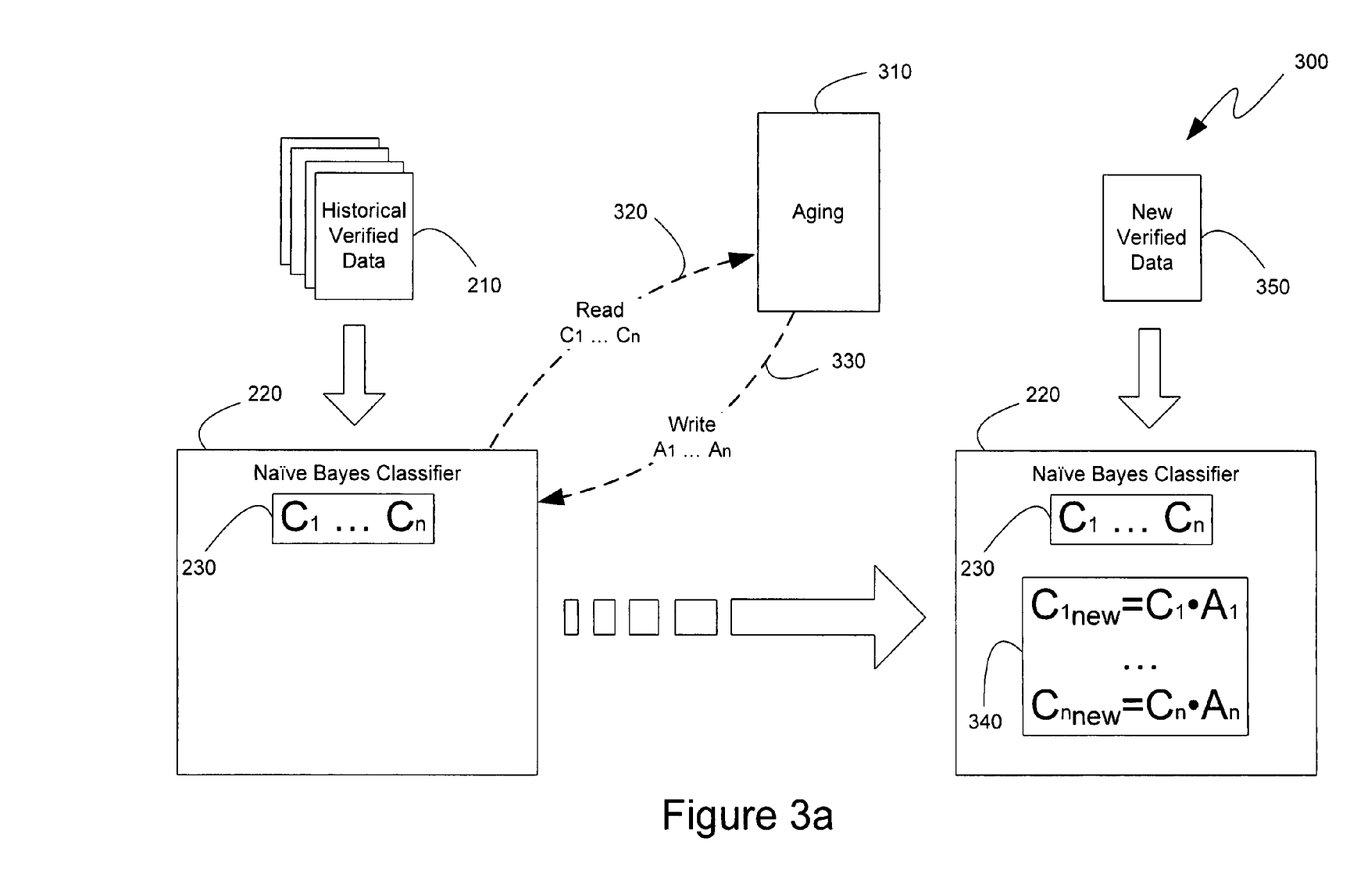
FIG. 3a is a block flow diagram illustrating an exemplary periodic aging

Turning to FIG. 3a, a block flow diagram 300 analogous to block flow diagram 200 is shown. As in block flow diagram 200, an NBC 220 can receive input from historical verified data 210 and can generate a statistical model that comprises a series of counts 230 in a known manner, with one count per feature per class. To illustrate the operation of the block flow diagram 300, the above example of five transactions, with three of the transactions having shipping addresses in the United States and two having shipping addresses in Nigeria, will be used. As above, given this example, the NBC 220 could build a statistical model comprising a series of counts as follows: $C_{shipping\_address=US\&class=legitimate}=2$, $C_{shipping\_address=US\&class=fraudulent}=1$, $C_{shipping\_address=Nigeria\&class=legitimate}=1$ and $C_{shipping\_address=Nigeria\&class=fraudulent}=1$.

The historical verified data 210 could be quite old. For purposes of the present example, the data can be considered to be one year old. In such a case, the counts 230 of the statistical model built by the NBC 220 may not accurately reflect the current state of legitimate commerce within the United States and Nigeria. Instead, new verified data 350 may be a more accurate indicator. An aging mechanism 310 can age the counts 230. In one embodiment, the aging mechanism 310 can periodically age the counts 230 by providing an aging factor for one or more of the counts to the NBC 220 on a periodic basis. The aging mechanism 310 can age each count individually or, alternatively, the aging mechanism can equally age all of the counts 230. In one embodiment, the aging mechanism 310 can comprise computer-readable instructions for periodically aging one or more counts. In an alternative embodiment, the aging mechanism 310 can further comprise an interface for providing a standard manner in which external processes can specify a particular aging factor to be applied to one or more counts. Such an interface can be a standard Application Program Interface (API) or can be any other published or unpublished interface and can be either limited to intra-process communication or can include inter-process communications. In a further alternative embodiment, the aging mechanism 310 can further comprise a mechanism for enabling a human user to specify an aging factor for one or more counts. For example, the aging mechanism 310 can include a front-end interface comprising common value entry elements, such as text boxes or slider bars. In addition, the front-end interface can also provide guidance to a user, such as guidance as to how particularly sized aging factors can affect the counts 230, such as, for example, given the age of the counts.

The aging mechanism 310 can also comprise an interface by which data from the NBC 220 can be read and by which the aging factors can be provided to the NBC. As shown in FIG. 3a, a read interface 320 can be used by the aging mechanism 310 to obtain the current count values 230, and, optionally, previous aging factors and the resulting aged counts, though FIG. 3a illustrates only the former, since the read interface 320 is shown, strictly as an example, as originating with the NBC 220 at a time prior to the application of any aging factors. Analogously, a write interface 330 can provide the aging factors to the NBC 220, which can then multiply the appropriate counts with the appropriate aging factors to obtain the aged counts 340, such as in the manner shown in FIG. 3a.

In some instances the aging factor may be zero, indicating that counts are aged instantaneously such that old data is deemed completely irrelevant Alternatively, the aging factor may be one, indicating that counts are not aged at all. The aging factor can also be greater than one in order to provide for the ability to increase the relevance of data from a particular period of time. For example, if more recent data is deemed to be anomalous, older data, that may have been previously aged, can be increased in relevance through an aging factor of greater than one.

The aging factor can applied on a periodic basis, such as, for example, once a month. Thus, in the above example, where the historical verified data 210 is one year old, an aging factor applied on a monthly basis would be applied 12 times by the aging mechanism 310. For example, if the aging factor was selected to be 0.9, then each of the counts would actually be multiplied by 0.9 to the $12^{th}$ power, or approximately 0.282. Using the above exemplary counts: $C_{shipping\_address=US\&class=legitimate}=2$, $C_{shipping\_address=US\&class=fraudulent}=1$, $C_{shipping\_address=Nigera\&class=legitimate}=1$ and $C_{shipping\_address=Nigera\&class=fraudulent}=1$, when aged would become: $C_{shipping\_address=US\&class=legitimate}=0.564$, $C_{shipping\_address=US\&class=fraudulent}=0.282$, $C_{shipping\_address=Nigera\&class=legitimate}=0.282$ and $C_{shipping\_address=Nigera\&class=fraudulent}=0.282$.

Alternatively, rather than being applied on a recursive, periodic basis, the aging factors can be applied directly to the original counts. In such a case, the aging factors applied can be varied as needed by the aging mechanism 310. For example, the data entries in the historically verified data 210 may be of various different ages; some could be just a month old, while others could be a couple of years old. The contribution of any particular data entry from among the verified data 210 to the count 230 can be modified by an individually applied aging factor. The NBC would then recalculate the counts 230 each time an aging of data entries is applied.

As will be recognized by those skilled in the art, a periodic aging process, by definition, will age counts in an exponential fashion. Applying aging factors to the original counts, however, allows the aging mechanism 310 to select a linear, non-linear but piecewise continuous, a piecewise discontinuous or otherwise non-exponential aging function. More specifically, the aging mechanism 310 can select the individual aging factors as appropriate given the aging function the aging mechanism desires to implement and can then provide those individual aging factors to the NBC 220, such as through the write interface 330. In order to enable the aging mechanism 310 to apply aging factors to the original data, the NBC 220 can retain counts 230 in addition to the aged counts 340, as shown in FIG. 3*a*.

Once the aging factors have been applied by the NBC a new statistical model comprising aged counts 340 is created as shown in FIG. 3*a*. If new verified data 350 is then subsequently provided to the NBC, the aged counts 340 can be modified accordingly. For example, if the new verified data 350 comprised a transaction that had a shipping address of Nigeria and was classified as fraudulent, that transaction, by itself, would cause the NBC to build a statistical model comprising updated counts as follows: $C_{shipping\_address=US\&class=legitimate}=0.564$, $C_{shipping\_address=US\&class=fraudulent}=0.282$, $C_{shipping\_address=Nigera\&class=legitimate}=0.282$ and $C_{shipping\_address=Nigera\&class=fraudulent}=1.282$. In other words, given the present example, the more recent transaction, by itself, shifted the predicted probability that a transaction specifying an address in Nigeria would be fraudulent from 50% to approximately 82%.

Figure 3B:
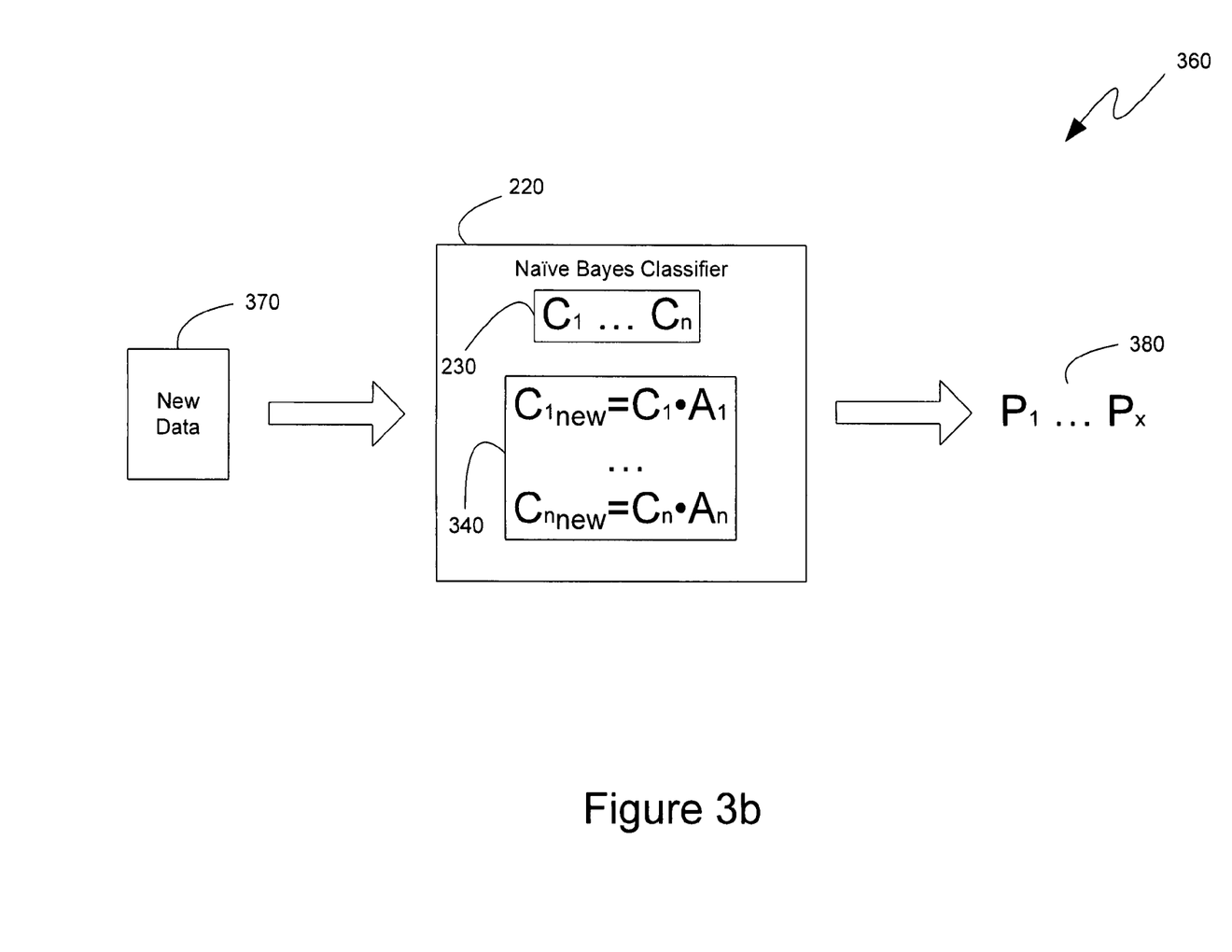
FIG. 3b is a block flow diagram illustrating an exemplary use of a periodic aging process for generating predictions.

Turning to FIG. 3*b*, block flow diagram 360 illustrates an exemplary usage of the NBC 220 as a predictive device. The NBC 220 can use the statistical model it created, comprising aged counts 340, to predict the classification of new data 370 based on the features of the new data 370. Thus, again returning to the above example, if the new data 370 comprised a transaction that includes a shipping address in Nigeria, the NBC 220 could indicate that the probability that the transaction was fraudulent was approximately 82%, while the probability that it was legitimate was approximately 18%. In the above example, there are only two classifications: legitimate and fraudulent. However, because NBCs can be used to assign probabilities to more than two classifications, a series of probabilities 380, with one probability per classification, can be provided by the NBC 220.

Figure 4:
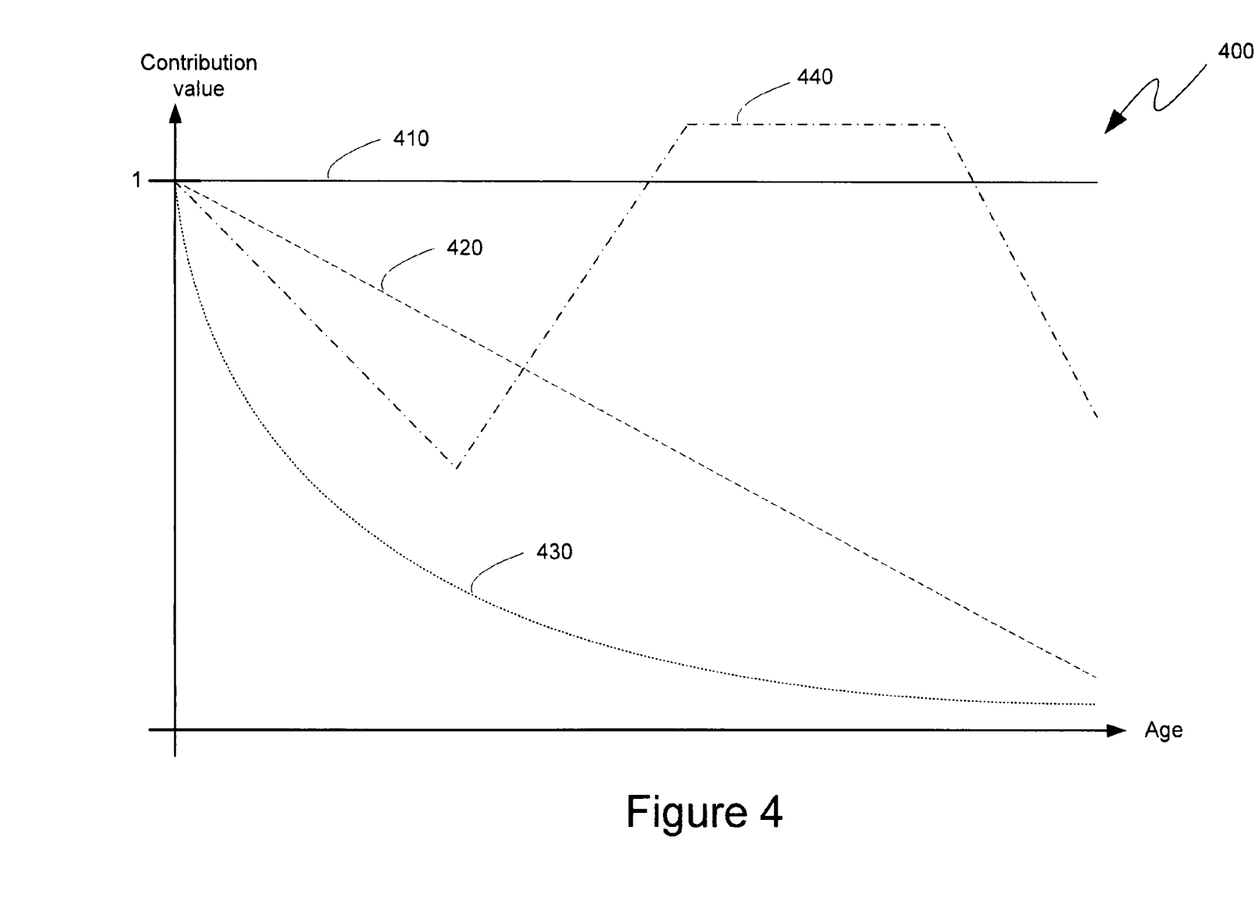
FIG. 4 is a graph illustrating exemplary correlations between aged count values and the age of those counts given various contemplated aging mechanisms and FIG. 5 is a flow diagram illustrating an exemplary automated process for selecting an aging factor.

The effect of the contribution to a count of a given data element, as correlated to the age of the data element is illustrated in FIG. 4 using graph 400. Each of the functions 420, 430 and 440 illustrate an exemplary aging function that can be implemented by the aging mechanism 310. Function 410 illustrates a lack of an aging function, since the contribution to a count from a data element does not change irrespective of the age of the data element. Function 430 illustrates a periodic aging process whereby an aging factor is applied on a periodic, iterative basis. As will be recognized by those skilled in the art, such an iterative application of an aging factor results in an exponential decrease in the value of the contribution of a particular data element to the count as the age of the data element increases.

Function 420 illustrates an exemplary function whereby the aging factor can be applied, not in an iterative basis, but rather individually to the original data elements. As such, the aging mechanism 310 can decrease the aging factor for data elements as the age of the data increases. Function 440 illustrates an exemplary function where an aging factor of greater than one can be used. Specifically, as shown, data of a particular age can have an increasing contribution to the count as the age of the data increases, in contrast to the remaining data, which can still have a decreasing contribution as the age of the data increases. Aging counts greater than one can be used to counteract previously applied aging counts that were less than one, or they can be used to increase the contribution of data that is deemed particularly relevant, such as if newer data is deemed to be anomalous.

Figure 5:
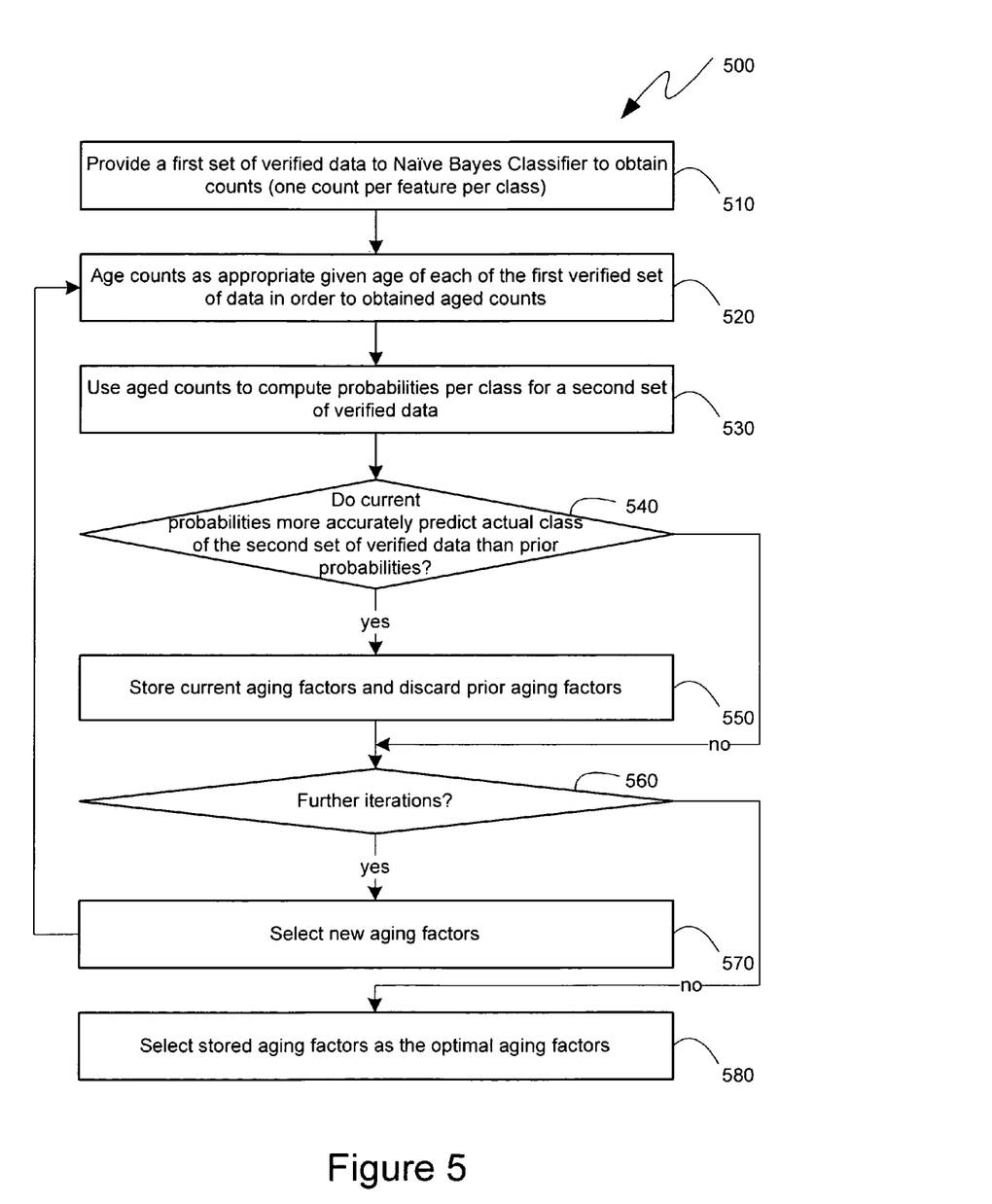

Rather than relying on a human user to select an appropriate aging factor, an automatic feedback system can be used to select an optimum aging factor for a specific historical context. Turning to FIG. 5, flowchart 500 illustrates an exemplary mechanism for providing for such an automatic feedback system. At step 510, the NBC is provided with a first set of verified data to obtain an initial set of counts. At step 520 aging is applied to one or more of the initial set of counts to obtain an aged set of counts. The aging that is applied at step 520 can be selected in a structured manner such that the operation of flowchart 500 determines an optimum aging factor within a predefined range.

Once the aged set of counts is obtained at step 520, it can be used, at step 530, to compute the probabilities that a second set of data that has already been verified is of a particular class. More specifically, a second set of data whose classification has already been verified can be used to test the predictive abilities of the NBC given the aging that was applied at step 520. The probabilities that are associated with each class for a given verified data entry, computed at step 530, can then be compared to the most accurate probabilities that had been calculated given some prior aging factor. Step 540 illustrates such a comparison. If the comparison indicates that the aging factor selected in step 520 is more accurate, then that aging factor is retained at step 550. Subsequently, at step 560, a determination can be made whether to perform additional iterations. If the comparison at step 540, however, indicates that the aging factor selected in step 520 is not more accurate, and that a previously selected aging factor remains the most accurate, then a determination can be made whether to perform additional iterations at step 560 without the need to retain the current aging factor at step 550.

If there remain aging factors that should be tried, step 570 can select one of those aging factors. Again, as in step 520, the aging factors can be selected in a structured manner so as to facilitate the determination of an optimum aging factor within a predefined range. Subsequently, the steps 520 through 560 can be performed using the aging factor selected in step 570. If no further iterations are required, then at step 580 the automated mechanism can select the aging factors stored at step 550 as the optimal aging factors.

As will be recognized by those skilled in the art, the optimal aging factors selected by the operations of the flowchart 500 are optimal with respect to the second set of verified data that was used to test them in steps 530 and 540 and, consequently, the practical predictive abilities of an NBC using the optimal aging factors selected at step 580 can be a function of the similarity between the second set of verified data that was used as test data and the data provided to the NBC in a practical setting, such as in an electronic commerce setting.

Although the above descriptions have described the boosting and aging mechanisms independently, both can be applied to the same set of counts to further improve the predictive accuracy of the NBC. Alternatively, an aging mechanism can be applied to the boost factors themselves. For example, a boost factor can have an expiration date, such that boosts older than a given age are aged by a factor of zero, and thereby eliminated. As another example, a boost factor can simply be aged and can, thereby decay over time. Furthermore, as with the boosting and the aging described individually, above, application of both boosting and aging to the same set of counts can be performed independently on a per-count basis.

In view of the many possible variations of the subject matter described herein, we claim as our invention all such embodiments as may come within the scope of the following claims and equivalents thereto.

We claim:

1. A method to be performed on a computing device, the computing device comprising a central processing unit and a memory, the method comprising:
   using the central processing unit to obtain one or more counts generated by a statistical classifier, the one or more counts being based on historical verified data, comprising one or more data entries, that is consumed by the statistical classifier;
   selecting one or more aging factors reflecting a correlation between the historical verified data's age and its relevance to new data, wherein the selecting the one or more aging factors comprises providing a user interface for selecting the one or more aging factors;
   aging the one or more counts with the one or more aging factors;
   classifying new data using the statistical classifier employing the aged one or more counts.

2. The method of claim 1 further comprising:
   selecting an initial set of one or more aging factors;
   aging the one or more counts with the initial set of one or more aging factors to form an initial aged set of counts;
   determining an initial predictive accuracy of the statistical classifier using the initial aged set of counts;
   selecting a subsequent set of one or more aging factors;
   aging the one or more counts with the subsequent set of one or more aging factors to form an subsequent aged set of counts;
   determining a subsequent predictive accuracy of the statistical classifier using the subsequent aged set of counts;
   comparing the initial predictive accuracy to the subsequent predictive accuracy; and
   selecting the one or more aging factors based on a highest relative predictive accuracy of the statistical classifier using the aged one or more counts.

3. The method of claim 1 further comprising:
   maintaining both the one or more counts and the aged one or more counts.

4. The method of claim 1, wherein the one or more aging factors are greater than 1.

5. The method of claim 1, wherein the aging the one or more counts is performed on a periodic basis.

6. The method of claim 1, wherein the aging the one or more counts occurs on an individual data entry basis.

7. The method of claim 1, wherein the selecting the one or more aging factors is based on a piecewise continuous aging function.

8. A statistical classification system comprising:
   a central processing unit coupled to a system memory, the system memory comprising:
   a statistical model comprising a series of counts, with each count counting a number of occurrences of a feature value per class amongst a set of data entries;
   a statistical classifier for generating the statistical model and using the statistical model to classify new data entries;
   and a count modification mechanism, external to the statistical classifier, for modifying the series of counts, wherein the count modification mechanism comprises a user interface for viewing or selecting modification data, wherein the count modification mechanism comprises a boosting mechanism for selecting one or more boost values for one or more counts of the series of counts, and, an aging mechanism for selecting one or more aging factors for one or more counts of the series of counts.

9. The statistical classification system of claim 8, wherein the series of counts comprises an aged series of counts and a non-aged series of counts.

10. The statistical classification system of claim 8, wherein the count modification mechanism further comprises a boosting mechanism for selecting one or more boost values for the one or more counts of the series of counts.

11. The statistical classification system of claim 8, wherein the aging mechanism selects the one or more aging factors by performing steps comprising:
   selecting an initial set of one or more aging factors;
   aging the one or more counts with the initial set of one or more aging factors to form an initial aged set of counts;
   determining an initial predictive accuracy of the statistical classifier using the initial aged set of counts;
   selecting a subsequent set of one or more aging factors;
   aging the one or more counts with the subsequent set of one or more aging factors to form an subsequent aged set of counts;
   determining a subsequent predictive accuracy of the statistical classifier using the subsequent aged set of counts;
   comparing the initial predictive accuracy to the subsequent predictive accuracy; and
   selecting the one or more aging factors based on a highest relative predictive accuracy of the statistical classifier using the aged one or more counts.

* * * * *